United States Patent
McInerney

(10) Patent No.: US 12,312,449 B2
(45) Date of Patent: May 27, 2025

(54) SUBSTRATE CONTAINING BOROSILICATE GLASS FOR HEAT REJECTION OR MITIGATION AND ENHANCED DURABILITY AND STRENGTH

(71) Applicant: Terrance M McInerney, Atlanta, GA (US)

(72) Inventor: Terrance M McInerney, Atlanta, GA (US)

( * ) Notice: Subject to any disclaimer, the term of this patent is extended or adjusted under 35 U.S.C. 154(b) by 553 days.

(21) Appl. No.: 17/362,395

(22) Filed: Jun. 29, 2021

(65) Prior Publication Data

US 2023/0044264 A1 Feb. 9, 2023

Related U.S. Application Data

(60) Provisional application No. 62/705,491, filed on Jun. 30, 2020.

(51) Int. Cl.
| | |
|---|---|
| *C03C 4/00* | (2006.01) |
| *C03C 3/089* | (2006.01) |
| *C03C 14/00* | (2006.01) |
| *C08J 3/22* | (2006.01) |

(52) U.S. Cl.
CPC .............. *C08J 3/226* (2013.01); *C03C 3/089* (2013.01); *C03C 4/00* (2013.01); *C03C 14/004* (2013.01); *C08J 2323/06* (2013.01); *C08J 2367/03* (2013.01)

(58) Field of Classification Search
CPC . C08J 3/22; C03C 3/089; C03C 14/00; C03C 4/00
USPC .......................................................... 523/351
See application file for complete search history.

(56) References Cited

U.S. PATENT DOCUMENTS

2020/0141029 A1 * 5/2020 Mason ...................... D01F 1/08

FOREIGN PATENT DOCUMENTS

| EP | 1426345 A1 * | 6/2004 | ......... B81C 1/00119 |
| WO | WO-2019099350 A1 * | 5/2019 | ............... D01D 5/08 |

* cited by examiner

*Primary Examiner* — Deve V Hall
(74) *Attorney, Agent, or Firm* — David J. Connaughton, Jr.; Justin P. Tinger; Yafei Xue

(57) ABSTRACT

The present disclosure relates to materials, and specifically to materials such as sheet, molded or extruded polymer materials containing flake, formed, powdered, granulated or splintered borosilicate glass for heat rejection or mitigation and enhanced durability and strength. The invention provides a synthetic substrate that includes: 1 to 70 wt % borosilicate glass having an average size of 0.1 to 50 um; and 30 to 99 wt % polymer material, wherein the synthetic substrate has either a denier ranging between 0.1 to 20.0 or a thickness ranging between 0.1 to 20 MIL, which provides thermal management properties including reduction in solar absorptance and net power absorbed by surfaces. The greater the intensity of the solar radiation the more reactive the borosilicate becomes, reflecting and dissipating an increased level of energy.

18 Claims, No Drawings

SUBSTRATE CONTAINING BOROSILICATE GLASS FOR HEAT REJECTION OR MITIGATION AND ENHANCED DURABILITY AND STRENGTH

BACKGROUND

Technical Field

The present disclosure relates to materials, and specifically to substrates such as sheet, molded or extruded polymer materials containing flake, formed, powdered, granulated or splintered borosilicate glass for heat rejection or mitigation and enhanced durability and strength.

Technical Background

Polymers have traditionally been used to make sheet, molded or extruded items. Additionally, polymers are added to various materials to impart special characteristics such as improved strength or improved optical properties; or to impart other desirable properties to an article. It would be advantageous if a substrate could impart other functional properties to an article, such as, for example, thermal management properties including reduction in solar absorptance and net power absorbed by surfaces. These needs and other needs are satisfied by the compositions and methods of the present disclosure.

The invention provides a substrate that includes: 1 to 70 wt % borosilicate glass having an average size of 0.1 to 50 um; and 30 to 99 wt % polymer material. Also provided are polymers, borosilicate material, and articles that include the synthetic substrate, and methods of making the same. This is a Non-Provisional application for the Provisional Application No. 62/705,491.

SUMMARY

In accordance with the purpose(s) of the invention, as embodied and broadly described herein, this disclosure, in one aspect, relates to substrate materials, and specifically to substrate materials containing borosilicate flake glass.

In one aspect, the present disclosure provides a synthetic substrate, wherein the substrate material comprises flaked borosilicate glass.

In another aspect, the present disclosure provides a method for improving the thermal properties of a material, the method comprising combining a substrate composition comprising borosilicate flake glass with other similar or dissimilar substrate to create an item.

In another aspect, the present disclosure provides a method for preparing a thermal barrier material, the method comprising forming a substrate from a polymer composition, wherein the substrate composition comprises borosilicate glass and a plurality of filaments, threads, substrates, or a combination thereof.

DESCRIPTION

The present invention can be understood more readily by reference to the following detailed description of the invention and the examples included therein.

Before the present compounds, compositions, articles, systems, devices, and/or methods are disclosed and described, it is to be understood that they are not limited to specific synthetic materials unless otherwise specified, or to particular chemistries unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "a ketone" includes mixtures of two or more ketones.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or cannot occur, and that the description includes instances where said event or circumstance occurs and instances where it does not. For example, the phrase "optionally substituted alkyl" means that the alkyl group can or cannot be substituted and that the description includes both substituted and unsubstituted alkyl groups.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and several modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

As briefly described above, the present disclosure provides a substrate that can improve the thermal management properties of a sheet, molded, cast or extruded item, including thread, yarn, fabric or other material into which it is incorporated. In one aspect, the substrate comprises a flake, formed, powdered, granulated or splintered borosilicate glass. In another aspect, the substrate can be incorporated into a textile and/or sheet good. In yet another aspect, the substrate can be in the form of a textile and/or sheet good.

Historically, substrates have been utilized to impart desirable properties in textiles, polymers and mineral compounds, such as adding tensile strength or durability. Glass materials have also been added to substrates, such as hollow glass microspheres, to impart insulating properties. Glass materials, such as hollow glass spheres, have also been added to reduce the density of substrate materials. substrates can also be made from glass.

In contrast, the substrate of the present invention comprises flaked, formed, powdered, granulated or splintered glass, such as, for example, borosilicate glass. In one aspect, the addition of a flaked, formed, powdered, granulated or splintered glass can improve the ability of the resulting substrate to dissipate, move, and/or remove heat from an underlying substrate. In another aspect, the addition of a flaked glass can reduce the amount of heat energy transferred to or absorbed by a textile comprising the inventive substrate. While not wishing to be bound by theory, it is not believed that the improved thermal properties of the inventive substrate composition are due to the thermal insulation value of the glass itself, such as could be achieved through the addition of glass spheres.

As used herein, the term "substrate composition" is intended to refer to a mixture of substrate components, such as, for example, flaked glass and a vehicle and/or resin system, prior to drying and/or curing to form a substrate. Similarly, the terms "substrate" and "substrate material" are intended to refer to a cured, cooled and/or dried form of the substrate composition.

It should be understood that a substrate formed from a substrate composition will typically comprise the same components as the substrate composition, except for any volatile components that can evaporate, and/or any components that cross-link or react with other components, a substrate, or a combination thereof.

In a first aspect, the invention provides a synthetic substrate comprising: 1 to 70 wt % flake borosilicate glass and 30 to 99 wt % polymer material, wherein the synthetic substrate has a denier of 0.1 to 20.0.

Denier is a unit of measure defined as the weight in grams of 9000 meters of a substrate or yarn. It is a common way to specify the weight (or size) of the substrate or yarn. For example, polyester substrates that are 1.0 denier typically have a diameter of approximately 10 micrometers. Micro-denier substrates are those having a denier of 1.0 or less, while macro-denier substrates have a denier of greater than 1.0.

The denier of the inventive synthetic substrate is 0.1 to 20.0 (e.g., 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9 or 20.0 denier), including any and all ranges and subranges therein (e.g., 0.7 to 10.0). For example, in some embodiments, the synthetic substrate has a denier of 0.5 to 4.0 denier.

In some embodiments, the synthetic substrate comprises 1.0 to 70.0 wt % flake borosilicate glass (e.g., 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, 20.0, 20.1, 20.2, 20.3, 20.4, 20.5, 20.6, 20.7, 20.8, 20.9, 21.0, 21.1, 21.2, 21.3, 21.4, 21.5, 21.6, 21.7, 21.8, 21.9, 22.0, 22.1, 22.2, 22.3, 22.4, 22.5, 22.6, 22.7, 22.8, 22.9, 23.0, 23.1, 23.2, 23.3, 23.4, 23.5, 23.6, 23.7, 23.8, 23.9, 24.0, 24.1, 24.2, 24.3, 24.4, 24.5, 24.6, 24.7, 24.8, 24.9, 25.0, 25.1, 25.2, 25.3, 25.4, 25.5, 25.6, 25.7, 25.8, 25.9, 26.0, 26.1, 26.2, 26.3, 26.4, 26.5, 26.6, 26.7, 26.8, 26.9, 27.0, 27.1, 27.2, 27.3, 27.4, 27.5, 27.6, 27.7, 27.8, 27.9, 28.0, 28.1, 28.2, 28.3, 28.4, 28.5, 28.6, 28.7, 28.8, 28.9, 29.0, 29.1, 29.2, 29.3, 29.4, 29.5, 29.6, 29.7, 29.8, 29.9, 30.0, 30.1, 30.2, 30.3, 30.4, 30.5, 30.6, 30.7, 30.8, 30.9, 31.0, 31.1, 31.2, 31.3, 31.4, 31.5, 31.6, 31.7, 31.8, 31.9, 32.0, 32.1, 32.2, 32.3, 32.4, 32.5, 32.6, 32.7, 32.8, 32.9, 33.0, 33.1, 33.2, 33.3, 33.4, 33.5, 33.6, 33.7, 33.8, 33.9, 34.0, 34.1, 34.2, 34.3, 34.4, 34.5, 34.6, 34.7, 34.8, 34.9, 35.0, 35.1, 35.2, 35.3, 35.4, 35.5, 35.6, 35.7, 35.8, 35.9, 36.0, 36.1, 36.2, 36.3, 36.4, 36.5, 36.6, 36.7, 36.8, 36.9, 37.0, 37.1, 37.2, 37.3, 37.4, 37.5, 37.6, 37.7, 37.8, 37.9, 38.0, 38.1, 38.2, 38.3, 38.4, 38.5, 38.6, 38.7, 38.8, 38.9, 39.0, 39.1, 39.2, 39.3, 39.4, 39.5, 39.6, 39.7, 39.8, 39.9, 40.0, 40.1, 40.2, 40.3, 40.4, 40.5, 40.6, 40.7, 40.8, 40.9, 41.0, 41.1, 41.2, 41.3, 41.4, 41.5, 41.6, 41.7, 41.8, 41.9, 42.0, 42.1, 42.2, 42.3, 42.4, 42.5, 42.6, 42.7, 42.8, 42.9, 43.0, 43.1, 43.2, 43.3, 43.4, 43.5, 43.6, 43.7, 43.8, 43.9, 44.0, 44.1, 44.2, 44.3, 44.4, 44.5, 44.6, 44.7, 44.8, 44.9, 45.0, 45.1, 45.2, 45.3, 45.4, 45.5, 45.6, 45.7, 45.8, 45.9, 46.0, 46.1, 46.2, 46.3, 46.4, 46.5, 46.6, 46.7, 46.8, 46.9, 47.0, 47.1, 47.2, 47.3, 47.4, 47.5, 47.6, 47.7, 47.8, 47.9, 48.0, 48.1, 48.2, 48.3, 48.4, 48.5, 48.6, 48.7, 48.8, 48.9, 49.0, 49.1, 49.2, 49.3, 49.4, 49.5, 49.6, 49.7, 49.8, 49.9, 50.0, 50.1, 50.2, 50.3, 50.4, 50.5, 50.6, 50.7, 50.8, 50.9, 51.0, 51.1, 51.2, 51.3, 51.4, 51.5, 51.6, 51.7, 51.8, 51.9, 52.0, 52.1, 52.2, 52.3, 52.4, 52.5, 52.6, 52.7, 52.8, 52.9, 53.0, 53.1, 53.2, 53.3, 53.4, 53.5, 53.6, 53.7, 53.8, 53.9, 54.0, 54.1, 54.2, 54.3, 54.4, 54.5, 54.6, 54.7, 54.8, 54.9, 55.0, 55.1, 55.2, 55.3, 55.4, 55.5, 55.6, 55.7, 55.8, 55.9, 56.0, 56.1, 56.2, 56.3, 56.4, 56.5, 56.6, 56.7, 56.8, 56.9, 57.0, 57.1, 57.2, 57.3, 57.4, 57.5, 57.6, 57.7, 57.8, 57.9, 58.0, 58.1, 58.2, 58.3, 58.4, 58.5, 58.6, 58.7, 58.8, 58.9, 59.0, 59.1, 59.2, 59.3, 59.4, 59.5, 59.6, 59.7, 59.8, 59.9, 60.0, 60.1, 60.2, 60.3, 60.4, 60.5, 60.6, 60.7, 60.8, 60.9, 61.0, 61.1, 61.2, 61.3, 61.4, 61.5, 61.6, 61.7, 61.8, 61.9, 62.0, 62.1, 62.2, 62.3, 62.4, 62.5, 62.6, 62.7, 62.8, 62.9, 63.0, 63.1, 63.2, 63.3, 63.4, 63.5, 63.6, 63.7, 63.8, 63.9, 64.0, 64.1, 64.2, 64.3, 64.4, 64.5, 64.6, 64.7, 64.8, 64.9, 65.0, 65.1, 65.2, 65.3, 65.4, 65.5, 65.6, 65.7, 65.8, 65.9, 66.0, 66.1, 66.2, 66.3, 66.4, 66.5, 66.6, 66.7, 66.8, 66.9, 67.0, 67.1, 67.2, 67.3, 67.4, 67.5, 67.6, 67.7, 67.8, 67.9, 68.0, 68.1, 68.2, 68.3, 68.4, 68.5, 68.6, 68.7, 68.8, 68.9, 69.0, 69.1, 69.2, 69.3, 69.4, 69.5, 69.6, 69.7, 69.8, 69.9, 70 wt %), including any and all ranges and subranges therein (e.g., 15 to 25 wt %, 5 to 20 wt %, 7 to 12 wt %, etc.).

In some embodiments, at least 90% (e.g., at least 91, 92, 93, 94, 95, 96, 97, 98, 99, 99.5, or 99.9%) of the flake borosilicate glass present in the inventive substrate have sizes of less than 50 um (e.g., less than 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, 0.9, 0.8, 0.7, 0.6, 0.5, 0.4, 0.3 or 0.02 um).

The synthetic substrate comprises 30 to 99 weight % polymer material (e.g., 30.0, 30.1, 30.2, 30.3, 30.4, 30.5, 30.6, 30.7, 30.8, 30.9, 31.0, 31.1, 31.2, 31.3, 31.4, 31.5, 31.6, 31.7, 31.8, 31.9, 32.0, 32.1, 32.2, 32.3, 32.4, 32.5, 32.6, 32.7, 32.8, 32.9, 33.0, 33.1, 33.2, 33.3, 33.4, 33.5, 33.6, 33.7, 33.8, 33.9, 34.0, 34.1, 34.2, 34.3, 34.4, 34.5, 34.6, 34.7, 34.8, 34.9, 35.0, 35.1, 35.2, 35.3, 35.4, 35.5, 35.6, 35.7, 35.8, 35.9, 36.0, 36.1, 36.2, 36.3, 36.4, 36.5, 36.6, 36.7, 36.8, 36.9, 37.0, 37.1, 37.2, 37.3, 37.4, 37.5, 37.6, 37.7, 37.8, 37.9, 38.0, 38.1, 38.2, 38.3, 38.4, 38.5, 38.6, 38.7, 38.8, 38.9, 39.0, 39.1, 39.2, 39.3, 39.4, 39.5, 39.6, 39.7, 39.8, 39.9, 40.0, 40.1, 40.2, 40.3, 40.4, 40.5, 40.6, 40.7, 40.8, 40.9, 41.0, 41.1, 41.2, 41.3, 41.4, 41.5, 41.6, 41.7, 41.8, 41.9, 42.0, 42.1, 42.2, 42.3, 42.4, 42.5, 42.6, 42.7, 42.8, 42.9, 43.0, 43.1, 43.2, 43.3, 43.4, 43.5, 43.6, 43.7, 43.8, 43.9, 44.0, 44.1, 44.2, 44.3, 44.4, 44.5, 44.6, 44.7, 44.8, 44.9, 45.0, 45.1, 45.2, 45.3, 45.4, 45.5, 45.6, 45.7, 45.8, 45.9, 46.0, 46.1, 46.2, 46.3, 46.4, 46.5, 46.6, 46.7, 46.8, 46.9, 47.0, 47.1, 47.2, 47.3, 47.4, 47.5, 47.6, 47.7, 47.8, 47.9, 48.0, 48.1, 48.2, 48.3, 48.4, 48.5, 48.6, 48.7, 48.8, 48.9, 49.0, 49.1, 49.2, 49.3, 49.4, 49.5, 49.6, 49.7, 49.8, 49.9, 50.0, 50.1, 50.2, 50.3, 50.4, 50.5, 50.6, 50.7, 50.8, 50.9, 51.0, 51.1, 51.2, 51.3, 51.4, 51.5, 51.6, 51.7, 51.8, 51.9, 52.0, 52.1, 52.2, 52.3, 52.4, 52.5, 52.6, 52.7, 52.8, 52.9, 53.0, 53.1, 53.2, 53.3, 53.4, 53.5, 53.6, 53.7, 53.8, 53.9, 54.0, 54.1, 54.2, 54.3, 54.4, 54.5, 54.6, 54.7, 54.8, 54.9, 55.0, 55.1, 55.2, 55.3, 55.4, 55.5, 55.6, 55.7, 55.8, 55.9, 56.0, 56.1, 56.2, 56.3, 56.4, 56.5, 56.6, 56.7, 56.8, 56.9, 57.0, 57.1, 57.2, 57.3, 57.4, 57.5, 57.6, 57.7, 57.8, 57.9, 58.0, 58.1, 58.2, 58.3, 58.4, 58.5, 58.6, 58.7, 58.8, 58.9, 59.0, 59.1, 59.2, 59.3, 59.4, 59.5, 59.6, 59.7, 59.8, 59.9, 60.0, 60.1, 60.2, 60.3, 60.4, 60.5, 60.6, 60.7, 60.8, 60.9, 61.0, 61.1, 61.2, 61.3, 61.4, 61.5, 61.6, 61.7, 61.8, 61.9, 62.0, 62.1, 62.2, 62.3, 62.4, 62.5, 62.6, 62.7, 62.8, 62.9, 63.0, 63.1, 63.2, 63.3, 63.4, 63.5, 63.6, 63.7, 63.8, 63.9, 64.0, 64.1, 64.2, 64.3, 64.4, 64.5, 64.6, 64.7, 64.8, 64.9, 65.0, 65.1, 65.2, 65.3, 65.4, 65.5, 65.6, 65.7, 65.8, 65.9, 66.0, 66.1, 66.2, 66.3, 66.4, 66.5, 66.6, 66.7, 66.8, 66.9, 67.0, 67.1, 67.2, 67.3, 67.4, 67.5, 67.6, 67.7, 67.8, 67.9, 68.0, 68.1, 68.2, 68.3, 68.4, 68.5, 68.6, 68.7, 68.8, 68.9, 69.0, 69.1, 69.2, 69.3, 69.4, 69.5, 69.6, 69.7, 69.8, 69.9, 70.0, 70.1, 70.2, 70.3, 70.4, 70.5, 70.6, 70.7, 70.8, 70.9, 71.0, 71.1, 71.2, 71.3, 71.4, 71.5, 71.6, 71.7, 71.8, 71.9, 72.0, 72.1, 72.2, 72.3, 72.4, 72.5, 72.6, 72.7, 72.8, 72.9, 73.0, 73.1, 73.2, 73.3, 73.4, 73.5, 73.6, 73.7, 73.8, 73.9, 74.0, 74.1, 74.2, 74.3, 74.4, 74.5, 74.6, 74.7, 74.8, 74.9, 75.0, 75.1, 75.2, 75.3, 75.4, 75.5, 75.6, 75.7, 75.8, 75.9, 76.0, 76.1, 76.2, 76.3, 76.4, 76.5, 76.6, 76.7, 76.8, 76.9, 77.0, 77.1, 77.2, 77.3, 77.4, 77.5, 77.6, 77.7, 77.8, 77.9, 78.0, 78.1, 78.2, 78.3, 78.4, 78.5, 78.6, 78.7, 78.8, 78.9, 79.0, 79.1, 79.2, 79.3, 79.4, 79.5, 79.6, 79.7, 79.8, 79.9, 80.0, 80.1, 80.2, 80.3, 80.4, 80.5, 80.6, 80.7, 80.8, 80.9, 81.0, 81.1, 81.2, 81.3, 81.4, 81.5, 81.6, 81.7, 81.8, 81.9, 82.0, 82.1, 82.2, 82.3, 82.4, 82.5, 82.6, 82.7, 82.8, 82.9, 83.0, 83.1, 83.2, 83.3, 83.4, 83.5, 83.6, 83.7, 83.8, 83.9, 84.0, 84.1, 84.2, 84.3, 84.4, 84.5, 84.6, 84.7, 84.8, 84.9, 85.0, 85.1, 85.2, 85.3, 85.4, 85.5, 85.6, 85.7, 85.8, 85.9, 86.0, 86.1, 86.2, 86.3, 86.4, 86.5, 86.6, 86.7, 86.8, 86.9, 87.0, 87.1, 87.2, 87.3, 87.4, 87.5, 87.6, 87.7, 87.8, 87.9, 88.0, 88.1, 88.2, 88.3, 88.4, 88.5, 88.6, 88.7, 88.8, 88.9, 89.0, 89.1, 89.2, 89.3, 89.4, 89.5, 89.6, 89.7, 89.8, 89.9, 90.0, 90.1, 90.2, 90.3, 90.4, 90.5, 90.6, 90.7, 90.8, 90.9, 91.0, 91.1, 91.2, 91.3, 91.4, 91.5, 91.6, 91.7, 91.8, 91.9, 92.0, 92.1, 92.2, 92.3, 92.4, 92.5, 92.6, 92.7, 92.8, 92.9, 93.0, 93.1, 93.2, 93.3, 93.4, 93.5, 93.6, 93.7, 93.8, 93.9, 94.0, 94.1, 94.2, 94.3, 94.4, 94.5, 94.6, 94.7, 94.8, 94.9, 95.0, 95.1, 95.2, 95.3, 95.4, 95.5, 95.6, 95.7, 95.8, 95.9, 96.0, 96.1, 96.2, 96.3, 96.4, 96.5, 96.6, 96.7, 96.8, 96.9, 97.0, 97.1, 97.2, 97.3, 97.4, 97.5, 97.6, 97.7, 97.8, 97.9, 98.0, 98.1, 98.2, 98.3, 98.4, 98.5, 98.6, 98.7, 98.8, 98.9 or 99.0 wt % polymer material), including any and all ranges and subranges therein.

The polymer material used in the synthetic substrate comprises any desired polymer matrix within which the borosilicate glass are comprised. For example, in some embodiments the polymer material is selected from polyester, nylon, acrylic, polylactic acid (also known as polylactide) (PLA), polyolefin, acetate, aramid, lyocell, spandex, viscose, modal, polypropylene, polyamide, poly(butyl acrylate) (PBA), acrylate, rayon, and combinations thereof. In particular embodiments, the polymer material comprises polyester. In certain embodiments, the polymer material comprises PET or PBT.

In some embodiments, the polymer material is or comprises a thermoplastic polymer (e.g., a polyester elastomer, such those marketed by Hytrel, e.g., Hytrel Type 5556).

In some embodiments, the polymer material is or comprises a thermoplastic polymer having properties similar to those of the Hytrel Type 5556 polyester elastomer. For example, in some embodiments, the polymer material is or comprises a polymer having one or more quantifiable properties, $P_i$, in the range of $P_{5556}+/-0.15 P_{5556}$, wherein $P_i$ is the property of the material used in the inventive substrate, and $P_{5556}$ is the corresponding property of the Hytrel Type 5556 polyester elastomer.

In some embodiments, the polymer material comprises polyester, wherein said polyester is selected from polyethylene terephthalate (PET), poly(hexahydro-p-xylylene terephthalate), polybutylene terephthalate (PBT), poly-1,4-cyclohexelyne dimethylene (PCDT) and terephthalate copolyesters in which at least 85 mole percent of the ester units are ethylene terephthalate or hexahydro-p-xylylene terephthalate units. In a particular embodiment, the polyester is polyethylene terephthalate.

In some embodiments, the polymer material comprises recycled polyester (e.g., recycled PET or PBT).

Embodiments of the inventive synthetic substrate provide polymeric substrates within which borosilicate glass are embedded in polymer material. In some embodiments, the borosilicate glass are homogenously mixed within the polymer material, meaning, the mixture of polymer material and borosilicate glass comprised within the synthetic substrate has a substantially uniform (i.e., 90-100% uniform, e.g., at least 90.0, 90.1, 90.2, 90.3, 90.4, 90.5, 90.6, 90.7, 90.8, 90.9, 91.0, 91.1, 91.2, 91.3, 91.4, 91.5, 91.6, 91.7, 91.8, 91.9, 92.0, 92.1, 92.2, 92.3, 92.4, 92.5, 92.6, 92.7, 92.8, 92.9, 93.0, 93.1, 93.2, 93.3, 93.4, 93.5, 93.6, 93.7, 93.8, 93.9, 94.0, 94.1, 94.2, 94.3, 94.4, 94.5, 94.6, 94.7, 94.8, 94.9, 95.0, 95.1, 95.2, 95.3, 95.4, 95.5, 95.6, 95.7, 95.8, 95.9, 96.0, 96.1, 96.2, 96.3, 96.4, 96.5, 96.6, 96.7, 96.8, 96.9, 97.0, 97.1, 97.2, 97.3, 97.4, 97.5, 97.6, 97.7, 97.8, 97.9, 98.0, 98.1, 98.2, 98.3, 98.4, 98.5, 98.6, 98.7, 98.8, 98.9, 99.0, 99.1, 99.2, 99.3, 99.4, 99.5, 99.6, 99.7, 99.8, or 99.9% uniform) composition.

In one aspect, the substrate composition of the present invention can comprise a polyester. In another aspect, the substrate of the present invention can comprise a nylon. In another aspect, the substrate of the present invention can comprise one or more combinations of polymer compounds know to the art such as polypropylene, polyolefin or acrylic. In yet another aspect, the substrate of the present invention can comprise any polymer capable of being extruded or otherwise formed to include flaked borosilicate glass. In another aspect, the substrate composition does not comprise a polymer. In still another aspect, the substrate composition does not comprise a polymer combination, such as, for example, a mineral composition.

The substrate composition of the present invention comprises a glass. In various aspects, the glass can be any glass or mixture of glass materials that can impart the desired thermal management properties to an underlying or coated material. In one aspect, the glass comprises boron. In another aspect, the glass comprises a borosilicate glass. In various aspects, the glass can comprise one or more of the following: boron, silica, alumina, calcium oxide, potassium and/or sodium oxides, lead, or a combination thereof. In another aspect, the glass does not comprise lead. In yet another aspect, the glass does not comprise a heavy metal. It should be understood that glass compositions vary, and that the specific composition of any particular glass or mixture of glasses can comprise other items not specifically recited herein.

In an exemplary aspect, the glass comprises from about 20 wt. % to about 50 wt. % boron, for example, about 20, 22, 24, 26, 28, 30, 32, 34, 36, 38, 40, 42, 44, 46, 48, or 50 wt. % boron. In other aspects, the amount of boron in a glass composition can be less than about 20 wt. % or greater than about 50 wt. %, and the present invention is not intended to be limited to any particular amount of boron in a glass composition.

In another aspect, the glass comprises from about 30 wt. % to about 70 wt. % silica, for example, about 30, 33, 36, 39, 42, 45, 48, 51, 54, 57, 60, 63, 66, 69, or 70 wt. % silica. In other aspects, the amount of silica present can be less than about 30 wt. % or greater than about 70 wt. %, and the present invention is not intended to be limited to any particular amount of silica.

In another aspect, the glass comprises, if at all, from about 0 wt. % to about 2 wt. % alumina, for example, about 0, 0.01, 0.05, 0.1, 0.15, 0.2, 0.25, 0.3, 0.4, 0.5, 0.6, 0.7, 0.8, 0.9, 1.0, 1.1, 1.2, 1.3, 1.4, 1.5, 1.6, 1.7, 1.8, 1.9, or 2 wt. % alumina.

In another aspect, the glass does not comprise alumina. In yet another aspect, the glass can comprise greater than about 2 wt. % alumina, and the present invention is not intended to be limited to any particular amount of alumina.

In another aspect, the glass comprises, if at all, from about 0 wt. % to about 5 wt. % calcium oxide, for example, about 0, 0.01, 0.02, 0.05, 0.1, 0.15, 0.2, 0.3, 0.4, 0.5, 0.75, 1, 1.25, 1.5, 1.75, 2, 2.25, 2.5, 2.75, 3, 3.25, 3.5, 3.75, 4, 4.25, 4.5, 4.75, or 5 wt. % calcium oxide.

In one aspect, the glass does not comprise calcium oxide. In still another aspect, the glass comprises greater than about 5 wt. % calcium oxide. In another aspect, the present invention is not intended to be limited to any particular amount of calcium oxide in a glass composition. In another aspect, the glass comprises, if at all, from about 0 wt. % to about 15 wt. % of potassium and/or sodium oxide, for example, about 0, 0.01, 0.02, 0.05, 0.1, 0.15, 0.2, 0.3, 0.4, 0.5, 0.75, 1, 1.5, 2, 2.5, 3, 3.5, 4, 4.5, 5, 6, 7, 8, 9, 10, 11, 12, 13, 14, or 15 wt. % of potassium and/or sodium oxide.

In one aspect, the glass does not comprise potassium oxide.

In another aspect, the glass does not comprise sodium oxide. In yet another aspect, the glass does not comprise an oxide of potassium and sodium. In another aspect, the glass comprises greater than about 15 wt. % of a potassium and/or sodium oxide.

The present invention is not intended to be limited to any particular amount of a potassium and/or sodium oxide in the glass composition. In another aspect, the glass composition can comprise, if at all, from about 0 wt. % to about 15 wt. % lead, for example, about 0, 0.01, 0.02, 0.05, 0.1, 0.15, 0.2, 0.3, 0.4, 0.5, 0.75, 1, 1.5, 2, 2.5, 3, 3.5, 4, 4.5, 5, 6, 7, 8, 9, 10, 11, 12, 13, 14, or 15 wt. % lead. In another aspect, the glass does not comprise lead. In yet another aspect, the glass comprises greater than about 15 wt. % lead.

Thus, the present invention is not intended to be limited to any particular amount of lead in the glass composition. In a specific aspect, the glass comprises from about 20 wt. % to about 50 wt. % boron, from about 30 wt. % to about 70 wt. % silica, from about 0.01 wt. % to about 2 wt. % alumina, from about 0.01 wt. % to about 5 wt. % calcium oxide, from about 0.01 wt. % to about 15 wt. % of an oxide of potassium and/or sodium, and from about 0.01 wt. % to about 15 wt. % lead.

In one aspect, the glass can comprise a varying morphology, such as, for example, can occur from crushing and/or grinding a glass composition. In one aspect, at least a portion of the glass comprises a flake morphology. In another aspect, at least a portion of the glass comprises a needle morphology. In yet another aspect, at least a portion of the glass particles are flat or substantially planar. In other aspects, the morphology of all or a portion of the glass particles is irregular and can vary from at least another portion of the glass particles. In another aspect, all or substantially all of the glass comprises a flake morphology. In one aspect, the glass does not comprise glass spheres, glass microspheres, or a combination thereof. In another aspect, the glass does not comprise a plurality of irregular shaped particles as can occur from crushing and/or grinding a glass composition. In yet another aspect, the glass is not intended to impart an insulating property to the resulting substrate as can be achieved, for example, with glass spheres.

In one aspect, the glass is particulate, wherein at least a portion of the particles have an average size in at least one dimension of from about 1 micrometers to about 100 micrometers, for example, about 1, 3, 5, 7, 9, 11, 13, 15, 17, 19, 21, 23, 25, 27, 29, 31, 33, 35, 37, 39, 43, 47, 51, 55, 59, 63, 67, 71, 75, 79, 83, 87, 91, 95, 99, or 100 micrometers. In another aspect, at least a portion of the particles have an average size in at least one dimension of from about 1 micrometers to about 45 micrometers, for example, about 5, 6, 8, 10, 12, 14, 16, 18, 20, 22, 24, 26, 28, 30, 32, 34, 36, 38, 40, 42, 44, or 45 micrometers. In still other aspects, at least a portion of the glass particles can have an average size in at least one dimension of less than about 1 micrometer or greater than about 100 micrometers, and the present invention is not intended to be limited to any particular size glass particles. Moreover, it should be understood that the size of glass particles is a distributional property and that the average and standard deviation for a particular batch of particles can vary.

In one aspect, at least a portion of the glass particles can have an aspect ratio of from about 1.001:1 to about 1000:1, for example, at least about 1.001:1, 1.005:1, 1.01:1, 1.05:1, 1.1:1, 1.2:1, 1.4:1, 1.6:1, 1.8:1, 2:1, 3:1, 4:1, 5:1, 6:1, 7:1, 8:1, 9:1, 10:1, 12:1, 14:1, 16:1, 18:1, 20:1, 22:1, 24:1, 26:1, 28:1, 30:1, 35:1, 40:1, 45:1, 50:1, 55:1, 60:1, 70:1, 80:1, 90:1, 100:1, 125:1, 150:1, 175:1, 200:1, 225:1, 250:1, 300:1, 400:1, 500:1, 600:1, 700:1, 800:1, 900:1, or 1000:1. In other aspects, the aspect ratio of at least a portion of the glass particles can be greater than about 1000:1. In another aspect, the aspect ratio of at least half of the glass particles is greater than about 100:1. In yet another aspect, the aspect ratio of all or substantially all of the glass particles is at least about 100:1.

In one aspect, the glass particles can be contacted with and/or mixed with a polymer or other substrate composition component. In various aspects, the substrate composition can comprise a polymer, such as, for example, a polyester polymer, a nylon polymer, a polyolefin polymer, polyethylene polymer, polybutylene polymer, an acrylic polymer, or a combination thereof. In a specific aspect, the substrate composition comprises a polyester polymer. In other aspects, the substrate material can comprise a nylon, an elastomeric material, or a cross-linkable material. In other aspects, the substrate composition can comprise other polymer systems or components that can be fashioned into substrate upon, for example, forming, curing and/or drying. In another aspect, the substrate composition is not an electrical insulation, such as, for example, an electrical insulation that is designed to be used in an electrical circuit or device.

Any of the individual components of a substrate composition can be contacted and/or mixed in any order. In one aspect, each of the components of a substrate composition can be contacted simultaneously. In another aspect, one or more components, such as, for example, the glass flake, can be added at a different time. In still another aspect, a commercially available substrate composition can be used, wherein one or more components, such as, for example, glass flake, are subsequently added. In one aspect, any of the individual components can be contacted and/or mixed so as to form a final substrate composition prior to forming.

It should be understood that the substrate compositions specifically recited herein are intended to be exemplary only, and that the present invention is not intended to be limited to any particular substrate composition. As such, one of skill in the art, in possession of this disclosure, could readily select an appropriate substrate composition for use with a given substrate and/or for an intended application.

Exemplary colorants, if present, can comprise one or more of: titanium dioxide, red oxide, yellow oxide, or any other oxide or a combination thereof. In one aspect, the substrate composition comprises at least titanium dioxide.

The amount of glass particles present in a substrate composition can be any amount suitable for the intended application. In one aspect, the amount of glass particles present in a substrate composition can be an amount sufficient to impart desirable thermal properties to the resulting substrate. In another aspect, the amount of glass particles present in a substrate composition can be an amount that does not adversely affect the mechanical properties of the resulting substrate. In various aspects, the amount of glass particles present in a substrate composition can comprise from about 5 wt. % to about 50 wt. %, for example, about 5, 6, 7, 8, 9, 10, 12, 14, 16, 18, 20, 22, 24, 26, 28, 30, 32, 34, 36, 38, 40, 42, 44, 46, 48, or 50 wt. % of the substrate composition. In another aspect, the amount of glass particles, such as, for example, glass flake, present in a substrate composition can be less than about 5 wt. % or greater than about 50 wt. %, provided that the resulting substrate can provide the desired thermal properties, and the present invention is not intended to be limited to any particular concentration of glass particles in the substrate composition.

In another aspect, the amount of glass particles present in a resulting substrate, for example, after curing and/or drying, can comprise from about 10 wt. % to about 80 wt. %, for example, about 10, 12, 14, 16, 18, 20, 23, 26, 29, 32, 35, 38, 41, 44, 47, 50, 53, 56, 59, 62, 65, 68, 71, 74, 77, or 80 wt. % of the resulting substrate. In other aspects, the amount of glass particles present in the resulting substrate can be less than about 10 wt. % or greater than about 80 wt. %, and the present invention is not intended to be limited to any particular concentration of glass particles in a resulting substrate.

Various crimps, including spiral (i.e., helical) and standard crimp, are known in the art. The synthetic substrate may have any desired crimp.

In some embodiments, the synthetic substrate is a staple substrate (i.e., a substrate having a standardized length). For example, in some embodiments, the synthetic substrate is a staple substrate having a length of 5 to 120 mm (e.g., 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, or 120 mm), including any and all ranges and subranges therein (e.g., 8 to 85 mm). In some embodiments, the invention provides a plurality of staple substrates.

In some embodiments, the synthetic substrate is a filament. A filament is a single long threadlike continuous textile substrate/strand. Unlike staple substrates, which are of finite length, filaments are of indefinite length, and can run for yards or miles (or e.g., where employed in yarn, can run the entire length of yarn).

In some embodiments, the filament ranges in length from 5 inches to several miles, including any and all ranges and subranges therein. For example, in some embodiments, the filament may be at least 5 inches in length (e.g., at least 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 inches in length, or any range or subrange therein).

In some embodiments, the filaments may be at least 1 foot in length (e.g., at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 feet in length, or any range or subrange therein).

Filaments may be created by a process known as extrusion (which can also be called melt spinning). For example, in some embodiments, after mixing borosilicate glass and polymer material, the resultant borosilicate glass/polymer mixture may be extruded as a borosilicate glass/polymer pellet. Subsequently, depending on desired borosilicate glass loading, a plurality of pellets, including at least the borosilicate glass/polymer pellet, may be extruded into substrate. For example, pellets can be extruded through well-known techniques, such as by bringing them to or beyond their melting point, thereby forming liquid borosilicate glass/polymer mixture, then forcing the liquid borosilicate glass/polymer mixture through a die called a spinneret. The spinneret often has many small holes through which the liquid passes. The liquid polymer streams are cooled upon exiting the spinneret, resulting in long strands of continuous synthetic substrates. The extruded filaments may optionally be combined with those of another (e.g., an adjoining) spinneret to increase the number of filaments in a bundle. A bundle of filaments may be drawn (stretched) to make each filament thinner, and may optionally be texturized, as described below.

Texturizing techniques may be performed on filament bundles (used, e.g., in yarn) to disrupt the parallelization of the filaments. Such techniques may serve, for example, to add bulk without adding weight, which can make the resultant yarn seem lighter in weight, have improved hand-feel (softness), appear more opaque, and/or have improved thermal management properties. While any art-acceptable texturizing processes may be employed, examples of texturizing processes conducive to use in the invention include crimping, looping, coiling, crinkling, twisting then untwisting and knitting then de-knitting.

In some embodiments, the synthetic substrate comprises a lubricious additive, such as that disclosed in U.S. Pat. No. 3,324,060. In some embodiments, the synthetic substrate does not comprise a lubricious additive, such as that disclosed in U.S. Pat. No. 3,324,060.

In some embodiments, the synthetic substrate additionally comprises one or more additional additives. For example, in some embodiments, the synthetic substrate additionally comprises aerogel. For example, in some embodiments, the synthetic substrate additionally comprises aerogel particles, as in, e.g., the synthetic substrate described in International Application Publication No. WO 2017/087511. For example, in some embodiments, the inventive substrate comprises 0.1 to 15 wt % aerogel particles, including any and all ranges and subranges therein (e.g., 1 to 10 wt %, 0.5 to 4.5 wt %, 1 to 4.5 wt %, 2 to 4.5 wt %, etc.), said aerogel particles having an average diameter of 0.3 to 20 including any and all ranges and subranges therein (e.g., 0.8 to 2 um).

Persons having ordinary skill in the art will readily appreciate that there are many applications within which the inventive synthetic substrate may be advantageously employed. Indeed, embodiments of the synthetic substrate and thermal management according to the invention find use in many different industries.

In a second aspect, the invention provides thermal management material comprising the synthetic substrate according to the first aspect of the invention.

In some embodiments, the thermal management material is yarn comprising the inventive synthetic substrate.

In a third aspect, the invention provides an article comprising the synthetic substrate of the first aspect of the invention, or the thermal management material of the second aspect of the invention.

In some non-limiting embodiments, the article is an article of footwear (e.g., shoes, socks, slippers, boots), outerwear (e.g. outerwear garments such as a jacket, coat, shoe, boot, pants (e.g., cycling wear, fishing jacket, etc.) glove, mitten, scarf, hat, etc.), clothing/apparel (e.g., shirts, pants, hats), active wear (e.g., clothing, including footwear, worn for sport or physical exercise), tents, shelter, awning, shade structure (e.g., beach shade, stroller awning), cushion, pet bed, home good, etc. In some embodiments, the inventive substrate is comprised within at least a part of one of the articles listed above.

In a fourth aspect, the invention provides a non-limiting method of making the inventive synthetic substrate, thermal management, or article comprising the synthetic substrate, said method comprising: mixing the borosilicate glass and the polymer material, thereby forming a glass/polymer mixture; extruding the glass/polymer mixture; molding the glass/polymer mixture; casting the glass/polymer mixture; or optionally performing one or more additional processing steps, thereby forming the synthetic substrate.

In some embodiments, during said mixing the borosilicate glass and the polymer material, both the borosilicate glass and the polymer material are dry.

In some embodiments, said extruding the borosilicate glass/polymer mixture comprises subjecting a dry borosilicate glass/polymer mixture to a melt extrusion process, thereby forming a borosilicate glass/polymer pellet or substrate.

In some embodiments, said additional processing steps comprise forming the synthetic substrate from the borosilicate glass/polymer pellet.

In some embodiments, the borosilicate glass/polymer pellet is extruded so as to form the synthetic substrate.

In some embodiments, during said mixing the borosilicate glass and the polymer material, both the borosilicate glass and the polymer material are dry.

In some embodiments, said extruding the borosilicate glass/polymer mixture comprises subjecting a dry borosilicate glass/polymer mixture to a melt extrusion process, thereby forming a borosilicate glass/polymer pellet or substrate.

In some embodiments, said additional processing steps comprise forming the synthetic substrate from the borosilicate glass/polymer pellet.

In some embodiments, the borosilicate glass/polymer pellet is extruded so as to form the synthetic substrate.

In some embodiments, extruding the borosilicate glass/polymer mixture forms a Substrate of denier X, and wherein the method further comprising drawing the Substrate of denier X in one or more drawing steps, thereby converting the Substrate of denier X to a Substrate of denier Y, wherein Y<X.

In some embodiments, the inventive method comprises 1, 2, 3, 4, or more drawing steps. The drawing step(s) may be any drawing steps. For example, in some embodiments, the drawing steps comprise, e.g., hot water quench drawing and/or hot oven drawing.

In some embodiments, solid polymer material is obtained in pre-ground form, or the polymer material is grinded, such that the polymer material is in the form of particles. In some embodiments, the polymer material is ground polymer material that resembles the consistency of sand. Flake borosilicate glass of a desired size are mixed with the polymer material to form a borosilicate glass/polymer mixture. The weight concentration of borosilicate glass to polymer may be selected for the desired properties of the resultant substrates.

The borosilicate glass/polymer mixture may then be extruded or otherwise formed into an intermediary product (e.g., as borosilicate glass/polymer pellets that can later be used to make substrate. In some embodiments (discussed in more detail below), this intermediary product may be referred to as a "master batch." In other embodiments, the borosilicate glass/polymer mixture may be directly extruded into substrate. Where an intermediary product (e.g., borosilicate glass/polymer pellets) is made, the intermediary product may optionally later be mixed with other material (e.g., other polymer material or other pellets that comprise a different borosilicate glass loading, or no borosilicate glass) so as to control and achieve a desired loading percent of borosilicate glass in subsequently-formed substrate.

Embodiments of the inventive method comprise forming substrate, either directly from the borosilicate glass/polymer mixture, or from the intermediary products (e.g., pellets), using appropriate textile substrate production methods, as are well known in the art. The textile substrate production method may include, for example, melt spinning, wet spinning, dry spinning, gel spinning, electro spinning, and the like as known in the art. For example, a mixture (e.g., the borosilicate glass/polymer mixture, or a mixture containing the intermediary products—for example, a mixture comprising melted intermediary products and optionally one or more other materials) may be extruded through spinnerets to form continuous filaments. The continuous filaments may then be manipulated by, for example, drawing, texturizing, crimping, and/or cutting, or another known method in the art, to form substrates in the most usable form for their final application. The continuous filaments may be cut to a specific length and packaged into a bale. The bale may then be sent, e.g., to a yarn spinner that processes the staple substrates into yarn (which could be further processed, e.g., for use in tents or apparel such as outer garments).

Processing steps undertaken to form the synthetic substrate or articles comprising the synthetic substrate can differ depending on the substrate that is intended to be formed. For example, in some embodiments, the inventive process forms a continuous filament by, e.g., drawing, texturizing, and optionally adding one or more desired finish chemistries. In some embodiments, the method forms staple substrates by, e.g., drawing, cutting, optionally crimping, and optionally adding one or more desired finish chemistries. It is contemplated that any desired finish chemistries may be used in accordance with the invention. Finish chemistries are well known in the art and include, e.g., siliconization, durable water repellency treatment, etc.

The synthetic substrate may be incorporated into articles (e.g., end products), for example, fabric, textile, sheet goods, films, molded parts, coolers and the like.

In some embodiments of the inventive method, the flake borosilicate glass are introduced into a polymer material, and, once mixed, the borosilicate glass/polymer mixture may be extruded into pellets, which may be referred to as a "master batch". The master batch may be transferred to a manufacturer for extruding, molding, casting or forming into a sheet or other desired polymer item. The master batch may be used to produce substrates. In some embodiments, the master batch is used to produce a fibrous, non-woven batting of filaments. In some embodiments, the master batch may be combined with pellets of other formulations to produce a desired material for use in substrates according to embodiments of the invention.

An embodiment of a method of mixing polymer material with flake borosilicate glass, as described in greater detail above, is shown. The method includes mixing a polymer material (any desired polymer, e.g., polyester pellets that are ground down to a sand-like consistency), with flake borosilicate glass so as to form a borosilicate glass/polymer mixture, wherein the flake borosilicate glass are mixed within the polymer material. In some embodiments, the mixture can comprise any additional additives, but in some embodiments, the mixture does not comprise additional additives. The mixture may be extruded into Substrate (which may be a filament or may be cut to staple Substrate), or formed into pellets, as described in greater detail above. Where the mixture is melt-extruded into pellets, the pellets may optionally be combined with additional pellets (to control borosilicate glass and any additional additive loading, e.g., aerogel loading), and may subsequently be extruded into Substrates.

The polymer material of the synthetic Substrate contains a plurality of flake borosilicate glass dispersed throughout the polymer material. The borosilicate glass may be homogeneously distributed throughout the polymer material. It is also contemplated that in some instances the borosilicate glass may be only at least partially embedded into the polymer material. The weight percentage of borosilicate glass dispersed throughout the polymer material will be dependent upon the desired properties (including weight) of the resultant synthetic Substrate.

The pellets contain a plurality of flake borosilicate glass dispersed throughout the polymer material. The flake borosilicate glass may be homogeneously distributed throughout the polymer material. The flake borosilicate glass completely embedded into the polymer material; it is also contemplated that in some instances the flake borosilicate glass may be only at least partially embedded into the polymer material in some locations of the pellets. The weight percentage of flake borosilicate glass dispersed throughout the polymer material will be dependent upon the desired properties of the resultant Substrate or insulation made from the pellets.

The greater the intensity of the solar radiation the more reactive the borosilicate becomes, reflecting and dissipating an increased level of energy. The solar radiations are much higher in space than on earth, which makes the substrate embedded with borosilicate flake glass material potential for space suit/ship applications.

EXAMPLES

The invention will now be illustrated, but not limited, by reference to the specific embodiments described in the following examples.

Example 1

A flake borosilicate glass/polymer mixture is prepared by mixing the following: 30% by weight flake borosilicate glass having dimensions of 10 micron or less; and 70% by weight polyester elastomer (e.g. Hytrel 5556).

After being mixed/blended, the flake borosilicate glass/polymer mixture is then extruded into pellets, which are subsequently mixed with polyester pellets. The pellet mix is later heated and extruded through a spinning method, for example spinnerets, to form continuous filaments. Once the continuous filaments are formed, they may be drawn, crimped, and/or cut to a specific length to form staple Substrates which are then packaged into bale, which may be optionally sent to a yarn spinner for the staple Substrates to be processed into yarns. The yarns may then be used downstream to create an article, such as, apparel and industrial fabrics. The yarns and insulation made from the synthetic Substrate containing the polymer material and flake borosilicate glass allow for fabrics and articles having reduced density.

Example 2

A flake borosilicate glass/polymer mixture is prepared by mixing the following: 25% by weight flake borosilicate glass having dimensions of 10 micron or less; and 75% by weight polybutylene terephthalate (PBT).

After being mixed/blended, the flake borosilicate glass/polymer mixture is then extruded into master batch (MB) pellets, which are subsequently mixed with polybutylene terephthalate (PBT) pellets and extruded into Substrate. The subsequent Substrate blend ratio is 25:75 (MB:PBT).

After extrusion, spinning, and drawing processing steps, a 4.6 denier per filament (dpf) Substrate was produced.

Example 3

In a third example, a fabric substrate was embedded with borosilicate flake glass, such that the dried coating was incorporated into the substrate, and not merely disposed as a layer on a surface of the substrate. The resulting composite was fabricated into a shelter and subjected to equatorially strong Solar heating. A similar control shelter was prepared from an uncoated portion of the fabric. Measurement results suggests that the substrate embedded with the coating composition reduced the surface temperature by 35% and the cooling load by 33% compared to an uncoated substrate. These effects are in effect due to the modification of the Near-infrared region (NIR) reflectance. The fabric substrate embedded with the inventive coating composition reduced the solar absorptance by 25% and the net power absorbed was reduced by 140 W/m2.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein.

Example 4

A flake, formed, powdered, granulated or splintered borosilicate glass/polymer mixture is prepared by mixing the following: 25% by weight borosilicate glass having dimensions of 10 micron or less; and 75% by weight high density polyethylene (HDPE).

After being mixed/blended, the borosilicate glass/polymer mixture is then extruded into master batch (MB) pellets, which are subsequently mixed with other HDPE pellets; heated to molten state then molded into a box and lid to form an improved ice chest.

What is claimed is:

1. A synthetic substrate comprising: 1 to 70% borosilicate glass by a total weight of the synthetic substrate having an average dimension of 1 to 50 um; and 30 to 90% polymer material by the total weight of the synthetic substrate, wherein the synthetic substrate has a denier of 0.1 to 20;
   wherein, the borosilicate glass has 30% to 70% of silica by the total weight of the synthetic substrate.

2. The synthetic substrate according to claim 1, wherein the borosilicate glass is granular.

3. The synthetic substrate according to claim 1, comprising 1 to 50% of the borosilicate glass by the total weight of the synthetic substrate.

4. The synthetic substrate according to claim 1, wherein the borosilicate glass has average dimension of 1 to 50 um.

5. The synthetic substrate according to claim 1, wherein the borosilicate glass is homogenously dispersed within the polymer material.

6. The synthetic substrate, according to claim 1, wherein the borosilicate glass shape is planar.

7. The synthetic substrate according to claim 1, wherein the borosilicate glass is needle-shaped.

8. The synthetic substrate according to claim 1, wherein the polymer material comprises polyethylene, polystyrene, nylon, polyester, polypropylene, acrylic, polyurethane or polyolefin polymer, or a combination thereof.

9. The synthetic substrate according to claim 1, wherein the substrate is a staple substrate having a length of 5 to 120 mm.

10. The synthetic substrate of claim 1, wherein, the borosilicate glass has up to 2% of alumina by the total weight of the synthetic substrate.

11. The synthetic substrate of claim 1, wherein, the borosilicate glass has more than 2% of alumina by the total weight of the synthetic substrate.

12. The synthetic substrate of claim 1, wherein, the borosilicate glass has up to 5% of calcium oxide by the total weight of the synthetic substrate.

13. The synthetic substrate of claim 1, wherein, the borosilicate glass has more than 5% of calcium oxide by the total weight of the synthetic substrate.

14. The synthetic substrate of claim 1, wherein, the borosilicate glass has up to 15% of potassium or sodium oxide by the total weight of the synthetic substrate.

15. The synthetic substrate of claim 1, wherein, the borosilicate glass has more than 15% of potassium or sodium oxide by the total weight of the synthetic substrate.

16. The synthetic substrate of claim 1, wherein, the borosilicate glass has up to 15% of lead by the total weight of the synthetic substrate.

17. The synthetic substrate of claim 1, wherein, the borosilicate glass has greater than 15% of lead by the total weight of the synthetic substrate.

18. The synthetic substrate of claim 1, wherein, the borosilicate glass has 30-70% of silica, 0.01-2% of alumina, 0.01-5% of calcium oxide, 0.01-15% of potassium or sodium oxide, and 0.01-15% of lead by the total weight of the synthetic substrate.

* * * * *